United States Patent
Tiirola et al.

(10) Patent No.: US 6,999,796 B2
(45) Date of Patent: Feb. 14, 2006

(54) BASE STATION, BASE STATION MODULE AND METHOD FOR ESTIMATING PARAMETERS OF UPLINK SIGNALS

(75) Inventors: Esa Tiirola, Oulu (FI); Kari Horneman, Oulu (FI)

(73) Assignee: Nokia Corporation, Espoo (FI)

( * ) Notice: Subject to any disclaimer, the term of this patent is extended or adjusted under 35 U.S.C. 154(b) by 180 days.

(21) Appl. No.: 10/451,957

(22) PCT Filed: Dec. 29, 2000

(86) PCT No.: PCT/EP00/13319

§ 371 (c)(1),
(2), (4) Date: Sep. 26, 2003

(87) PCT Pub. No.: WO02/054531

PCT Pub. Date: Jul. 11, 2002

(65) Prior Publication Data

US 2004/0056800 A1  Mar. 25, 2004

(51) Int. Cl.
*H04M 1/00* (2006.01)

(52) U.S. Cl. .................. 455/562.1; 455/513; 455/561; 342/147; 342/422

(58) Field of Classification Search ............ 455/561, 455/562.1, 277.1, 277.2, 276.1, 120, 121, 455/193.1, 13, 139, 513, 115.1–3, 132–135, 455/161.3, 226.1–2, 550.1; 342/74.81, 147, 342/359, 360, 374, 373, 422
See application file for complete search history.

(56) References Cited

U.S. PATENT DOCUMENTS

| 4,057,803 | A |   | 11/1977 | Coleman |
|---|---|---|---|---|
| 5,929,810 | A | * | 7/1999 | Koutsoudis et al. ........ 342/373 |
| 6,049,307 | A | * | 4/2000 | Lim ........................... 342/383 |
| 6,070,090 | A |   | 5/2000 | Feuerstein |
| 6,075,484 | A |   | 6/2000 | Daniel et al. |
| 6,345,188 | B1 | * | 2/2002 | Keskitalo et al. ........... 455/561 |

FOREIGN PATENT DOCUMENTS

| EP | 0 926 916 A2 | 6/1999 |
|---|---|---|
| EP | 0 961 416 A1 | 12/1999 |
| GB | 2 316 807 A | 3/1998 |
| GB | 2 337 171 A | 11/1999 |
| WO | WO 99/27659 | 6/1999 |
| WO | WO 02/052677 A1 | 7/2002 |

* cited by examiner

*Primary Examiner*—Congvan Tran
(74) *Attorney, Agent, or Firm*—Squire, Sanders & Dempsey LLP

(57) ABSTRACT

The invention relates to a base station for a radio communications network. In order to enable a simple enhancement of the estimation of parameters of uplink signals, it is proposed that the base station comprises a phasing network (11) for forming beams for fixed reception angles out of received signals provided by a receive antenna array; means (13) for determining the minimum deviation between a distribution indicative of the signal strengths of at least some of the formed beams and a plurality of pre-calculated distributions each corresponding to a different value of at least one specific parameter of the received signals; and means (13) for estimating the value of the at least one parameter in the uplink according to the minimum deviation. The invention equally relates to a method comprising the corresponding steps and to a base station module of a base station comprising corresponding means for determining the minimum deviation.

25 Claims, 6 Drawing Sheets

BASE STATION, BASE STATION MODULE AND METHOD FOR ESTIMATING PARAMETERS OF UPLINK SIGNALS

FIELD OF THE INVENTION

The invention relates to a base station for a radio communications network, a base station module of such a base station and a method for enhancing the estimation of parameters of signals in the uplink in a base station of a radio communications network.

BACKGROUND OF THE INVENTION

It is known from the state of the art to provide base stations with smart antenna arrays which enable the output of fully steerable downlink beams. When employed for a user specific digital beamforming, a beamformer of such a smart antenna array is e.g. able to weight phase angle and/or amplitude of the transmitted signals in a way that the direction of the beam is adapted to move along with a terminal through the whole sector of coverage of the antenna array.

In order to be able to move a downlink beam according to the movement of a terminal, the base station has to determine the direction in which the terminal can be found. This can be achieved by estimating the azimuth direction of arrival of the uplink signals received by the base station from the respective terminal. For receiving uplink signals, base stations often employ a fixed beam reception system, the fixed beams being evaluated for estimating the direction of arrival of the uplink signals.

For illustration, FIG. 1 shows an example of an architecture in a base station used for the processing of signals from a single user for estimating the direction of arrival.

The part of the base station depicted in FIG. 1 comprises an uplink digital beam matrix 11 connected at its inputs to a uniform linear antenna array (ULA) with eight receiver antennas (not shown). The output of the uplink digital beam matrix 11 is connected via means for standard RAKE processing 12 to means for estimating the direction of arrival DoA of uplink signals 13. The means for estimating the direction of arrival 13 are connected on the one hand to further components of the base station that are not shown. On the other hand, they are connected to processing means 14 suited for spreading and weighting of signals. The processing means 14 receive as further inputs signals from means for download bit processing 15 and output signals to means for user-specific digital beamforming 16. The outputs of the means for user-specific digital beamforming 16 are connected to eight transmit antennas (not shown). The means for standard RAKE 12, for estimation of the direction of arrival 13, for downlink bit processing 15 and the processing means 14 are used for digital base-band processing.

Signals entering the base station via the receive antennas are first processed in the digital beam matrix 11. The digital beam matrix 11 is an M×M matrix, where M is the number of antenna elements, i.e. M=8 in the described example. The digital beam matrix 11 generates from the received signals fixed reception beams in eight different directions. With the digital beam matrix 11 and the uniform linear antenna array (ULA), orthogonal beams (butler matrix) or an arbitrary set of non-orthogonal beams can be generated. The generated beams are input to the means for standard RAKE 12.

After a processing on the chip level by the means for standard RAKE 12, the beams are evaluated in the means for estimation of the direction of arrival 13 in order to be able to determine the best direction for transmission of downlink signals. The direction of arrival of the uplink signals can be estimated by simply measuring the power from each beam. In particular, the power in the pilot symbols in the channel estimate can be determined. The beam direction of the beam with the highest uplink power, averaged over fast fading, is considered as the direction of arrival, to which the downlink beam is to be directed. The direction of arrival of the uplink signals can be estimated just the same by any other known method for determining the direction of arrival in the beam space. The means for estimation of the direction of arrival 13 provide the processing means 14 with power control and weight information for forming the downlink beams corresponding to the determined direction of arrival. In addition, further elements in the means for estimation of the direction of arrival 13 forward soft bits, including the data signals transmitted by the terminal, to the components not depicted in the figure.

Hard bits constituting signals that are to be transmitted from the network to the terminal are processed, e.g. encoded, by the means for downlink bit processing 15 and forwarded to the processing means 14. The processing means 14 are able to spread and weight those signals according to the information received from the means for estimation the direction of arrival 13. The thus processed signals are transmitted to the means for user-specific digital beamforming 16 which transmit the signals via the transmit antennas in a downlink beam directed to the determined direction of arrival of the uplink signals.

With this method, the estimation of the uplink direction of arrival is based on a rough resolution grid in the form of the fixed beams. That means, even though in the downlink the transmission beam can be steered continuously with arbitrary resolution, the accuracy of the downlink beamforming is limited to the uplink beam spacing. This accuracy is not adequate for downlink beam steering, if the number of beams is equal to the number of columns in the smart antenna array. Even if the direction of arrival resolution is improved as the number of reception beams is increased by increasing the number of receive antennas, the angular resolution is not necessarily adequate with 4–8 beams/antennas. In the uplink, the angular resolution is approximately 30° with 4 beams and approximately 15° with 8 beams.

Alternatively to basing the estimation of the direction of arrival on the power of the fixed beams, the direction of the downlink beam can be selected by transforming the channel estimates back to the element domain. To this end, the beamformed signals are multiplied by an inverted digital beam matrix to obtain the element space signals. Then, any known direction of arrival techniques is used in the element space. However, for practical implementations this method leads to an excessive amount of computations.

In some applications, the knowledge of the angular spread is moreover equally important as or even more important than the knowledge of the direction of arrival for forming downlink beams.

SUMMARY OF THE INVENTION

It is an object of the invention to provide a base station, a base station module and a method which allow for a simple enhancement of the estimation of parameters of uplink signals.

This object is reached on the one hand with a base station for a radio communications network, comprising a phasing network for forming beams for fixed reception angles out of received signals provided by a receive antenna array; means for determining the minimum deviation between a distribution indicative of the signal strengths of at least some of the formed beams and a plurality of pre-calculated distributions indicative of signal strengths, each pre-calculated distribution corresponding to a different value of at least one specific parameter of the received signals; and means for estimating the value of the at least one parameter in the uplink according to the minimum deviation.

On the other hand, the object is reached with a method for enhancing the estimation of parameters of signals in the uplink in a base station of a radio communications network, comprising:

receiving uplink signals with a receive antenna array of the base station;

forming beams for fixed angles of arrival out of the received signals;

determining the minimum deviation between a distribution indicative of the signal strengths of at least some of the formed beams and a plurality of pre-calculated distributions indicative of signal strengths, the pre-calculated distributions corresponding to different values of at least one parameter of the received uplink signals; and estimating as value of the at least one parameter of the received signals the value of the at least one parameter corresponding to the determined minimum deviation.

The object is equally reached with a base station module for a base station according to the invention comprising means for determining the minimum deviation between a distribution indicative of the signal strengths of least some of formed beams and a plurality of pre-calculated distributions indicative of signal strengths, the pre-calculated distributions corresponding to different values of at least one parameter of the received signals.

The invention proceeds from the fact that in theory, a signal received at a base station via an antenna array can be seen in all beams regardless of the direction of arrival. The signal strength is only highest in the beam pointing to the direction of arrival. Since the signal strength in each beam is a function of different parameters of the received signals, like the direction of arrival or the standard deviation, sets of beams can be pre-calculated for different values of at least one parameter. When the beams created from received signals are formed and compared to such predetermined beams, the pre-calculated set of beams that corresponds best to the formed beams determines the value of the at least one parameter. Thus, the invention provides a simple possibility for enhancing the estimation of parameters of uplink signals.

The distribution indicative of the signal strengths can be in particular the power distribution over the used beams, but it includes as well any other distribution equivalent to a power distribution.

The at least one estimated parameter is used in particular for forming downlink beams.

Preferred embodiments of the invention become apparent from the subclaims.

The at least one parameter of the received signals can be in particular the direction of arrival and/or the standard deviation which indicates the angular spread of the received signals.

A receive antenna array employed for receiving uplink signals from a terminal and for providing the received signals to the phasing network of the base station can be comprised by the base station of the invention or form an supplementary part of the base station. Moreover, the phasing network can be digital or analogue, and the receive antenna array can comprise any number of antennas, e.g. eight or four antennas.

Equally, a transmit antenna array can be comprised by the base station of the invention or form an supplementary part. The transmit antenna array can be used for transmitting a downlink beam with the at least one estimated parameter value. The downlink beam can therefore e.g. be directed to an estimated direction of arrival and/or be formed with an estimated angular spread. It is to be noted that the basis of the generation of the downlink beams is not limited to parameters of the desired user only. In some applications, like in downlink null steering, the downlink beam is determined according to the parameters of other users interfering with the parameters of the desired user.

In order to restrict the number of comparisons with pre-calculated distributions, a possibility can be provided for first determining the power or some other equivalent signal value for at least some of the formed beam. Then, an angular region in which the direction of arrival should lie is determined according to the power or the equivalent signal values of these beams. In particular, the region around the beam with the highest power or equivalent signal value is suited as such angular region. The estimation of the minimum deviation proposed by the invention is only based on a comparison with pre-calculated distributions corresponding to directions of arrival in said angular region.

A preferred possibility of determining the minimum deviation is determining the minimum of the sum of the mean-square-errors of the signal values used for the distribution of signal strengths of at least some of the formed beam as compared to the corresponding signal values of one of the pre-calculated distributions.

The distribution over the at least some of the formed beams can be improved in several ways before comparison in order to achieve a more reliable result in the comparisons. For example, the distribution over at least some the formed beams can be averaged over a certain time region, e.g. over two or more frames. Moreover, different types of filter structures, like a smoother type filter, can be employed for filtering the distribution over at least some the formed beams before using it for determining the minimum deviation. Further, the signal value of each beam used for the distribution can be normalised with the total signal value of all formed beams used in the distribution.

The estimation can be further refined, if the comparison is carried out for a plurality of consecutively determined distributions. For each formed distribution, the minimum deviation and the at least one corresponding parameter value is determined. The different resulting parameter values can then be averaged, and the mean value is considered as total estimate of the least one parameter.

If more that one parameter is to be estimated at the same time, pre-calculated distributions for different combinations of those parameters are stored for the comparison. Preferably, pre-calculated distributions for different directions of arrival with different standard deviations are stored and compared to the distribution over at least some of the formed beams. Then, the expected direction of arrival and the standard deviation of the received signals can be estimated as the combination of the two parameters corresponding to the pre-calculated distribution resulting in the minimum deviation.

Before estimating the direction of arrival and/or the angular spread of received signals, a denser grid of beams could be determined by forming additional beams between respective neighbouring beams, as described in the copending application "Base station, base station module and method for direction of arrival estimation" of the same applicant, filed Dec. 23, 2000 and incorporated by reference herewith, thus refining the basis of the proposed estimation.

The base station, the base station module and the method according to the invention can be employed in particular in WCDMA systems, but they are not limited to such systems.

BRIEF DESCRIPTION OF THE FIGURES

In the following, the invention is explained in more detail with reference to drawings, of which

DETAILED DESCRIPTION OF THE INVENTION

Figure 1:
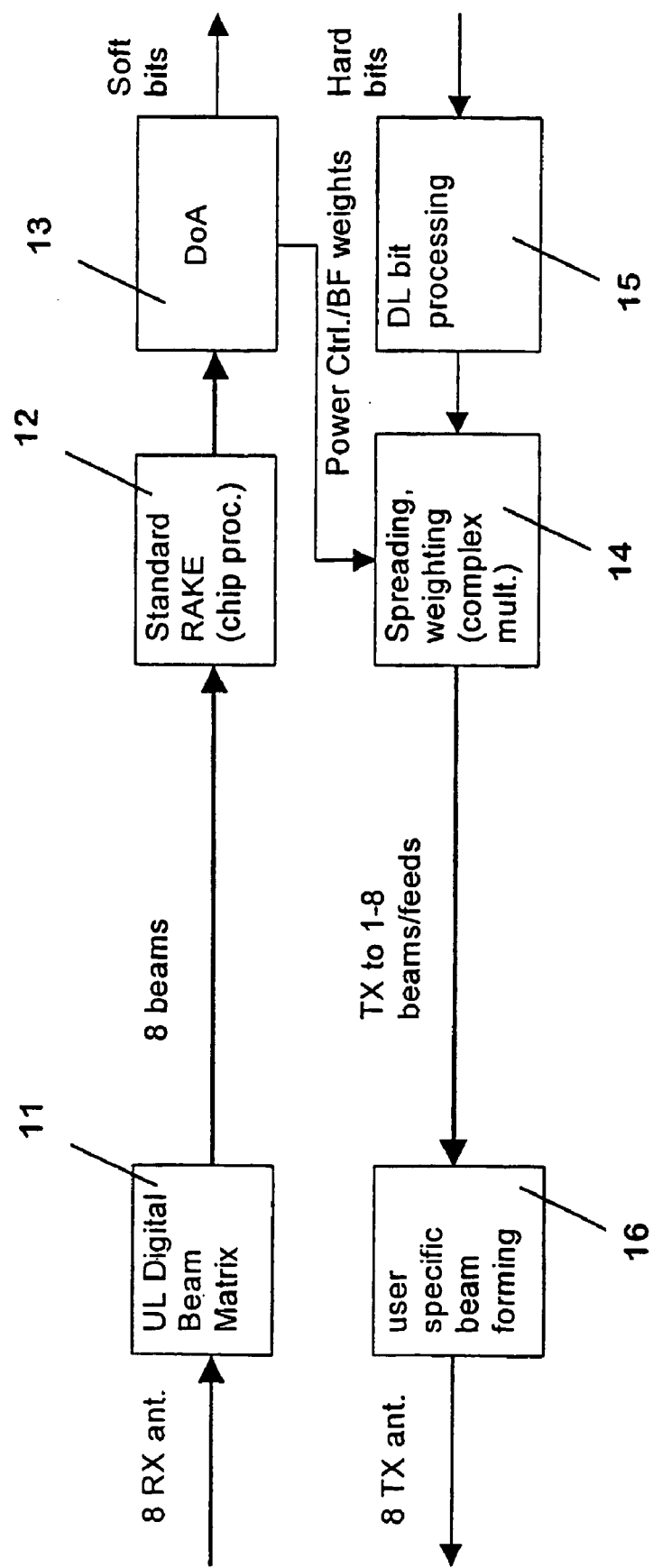
FIG. 1 shows the architecture in a base station for the processing of uplink signals from a single terminal.

FIG. 1 has already been described with reference to the background of the invention. The base station according to the invention has the same structure as the base station depicted in FIG. 1, only the means for estimating the direction of arrival 13 comprise additional means or functions for a refined estimation of the direction of arrival. Therefore, it is referred to FIG. 1 again in the following.

In the means 13 for estimating the direction of arrival of FIG. 1, pre-calculated sets of power distributions are stored. Each power distribution was calculated for a specific combination of a direction of arrival and a standard deviation of received signals.

Figure 2A:
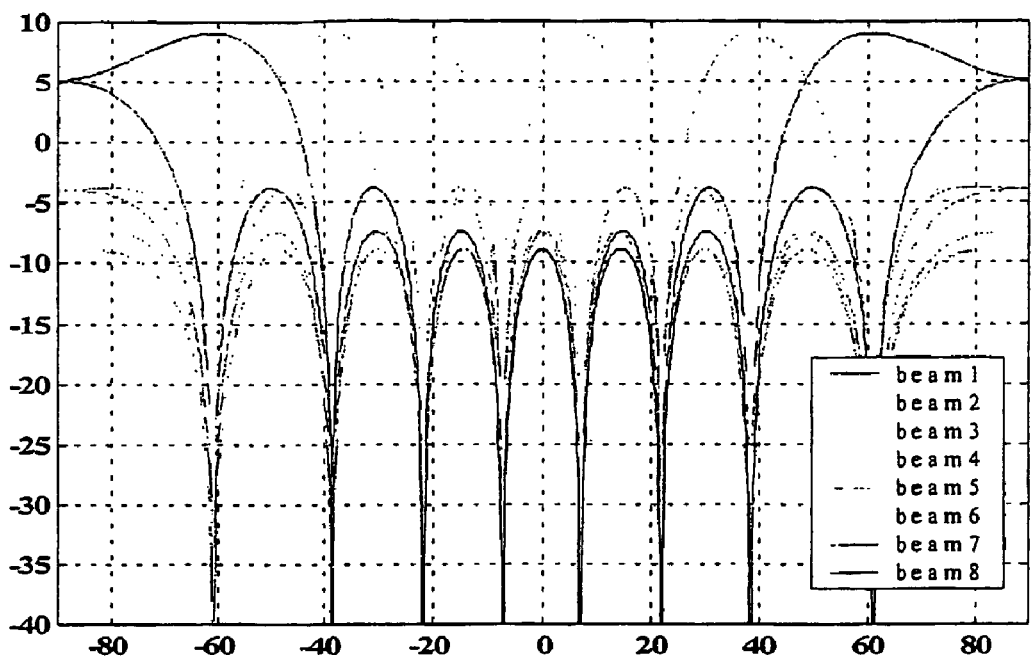
FIG. 2a shows orthogonal beams of an 8-antenna array.
Figure 2B:
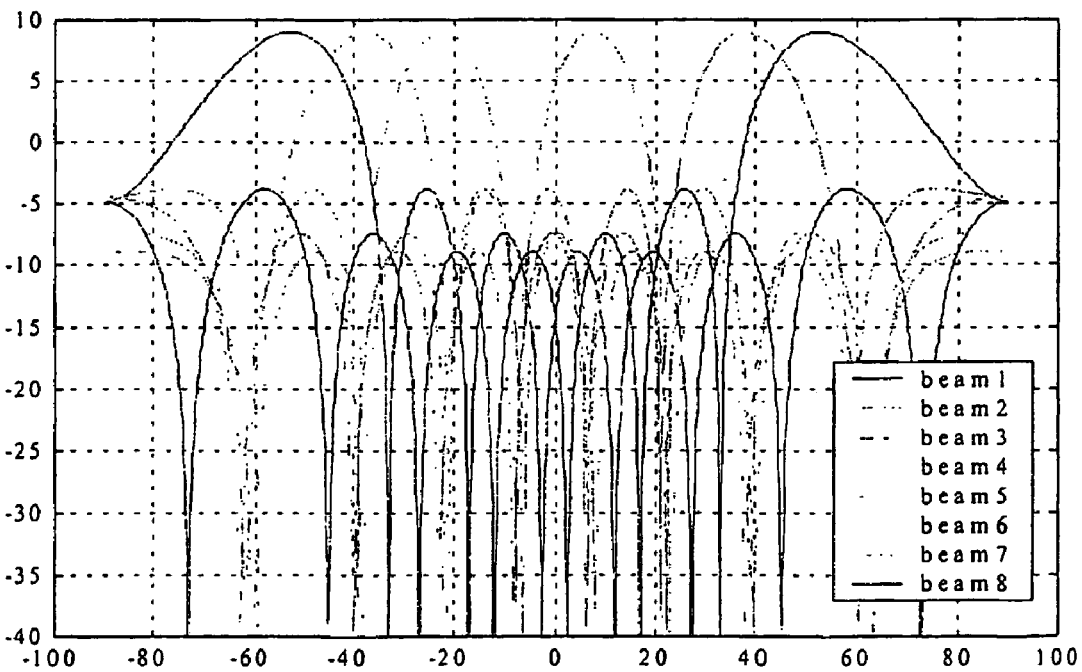
FIG. 2b shows non-orthogonal beams of an 8-antenna array.

In order to be able to calculate the power distribution over the beam space as a function of a predetermined direction of arrival and a predetermined standard deviation, the shape of the beams, the type of the power distribution of the arriving signal and the parameters of that distribution have to be known. The shape of the beams can be calculated from the configuration of the antenna array and from the beam matrix used. FIG. 2a shows an example of such shapes for 8 orthogonal beams and FIG. 2b shows an example of such shapes for 8 non-orthogonal beams. In both examples, the beam power is depicted in dB for the respective eight beams over the azimuth reception angle.

Figure 3:
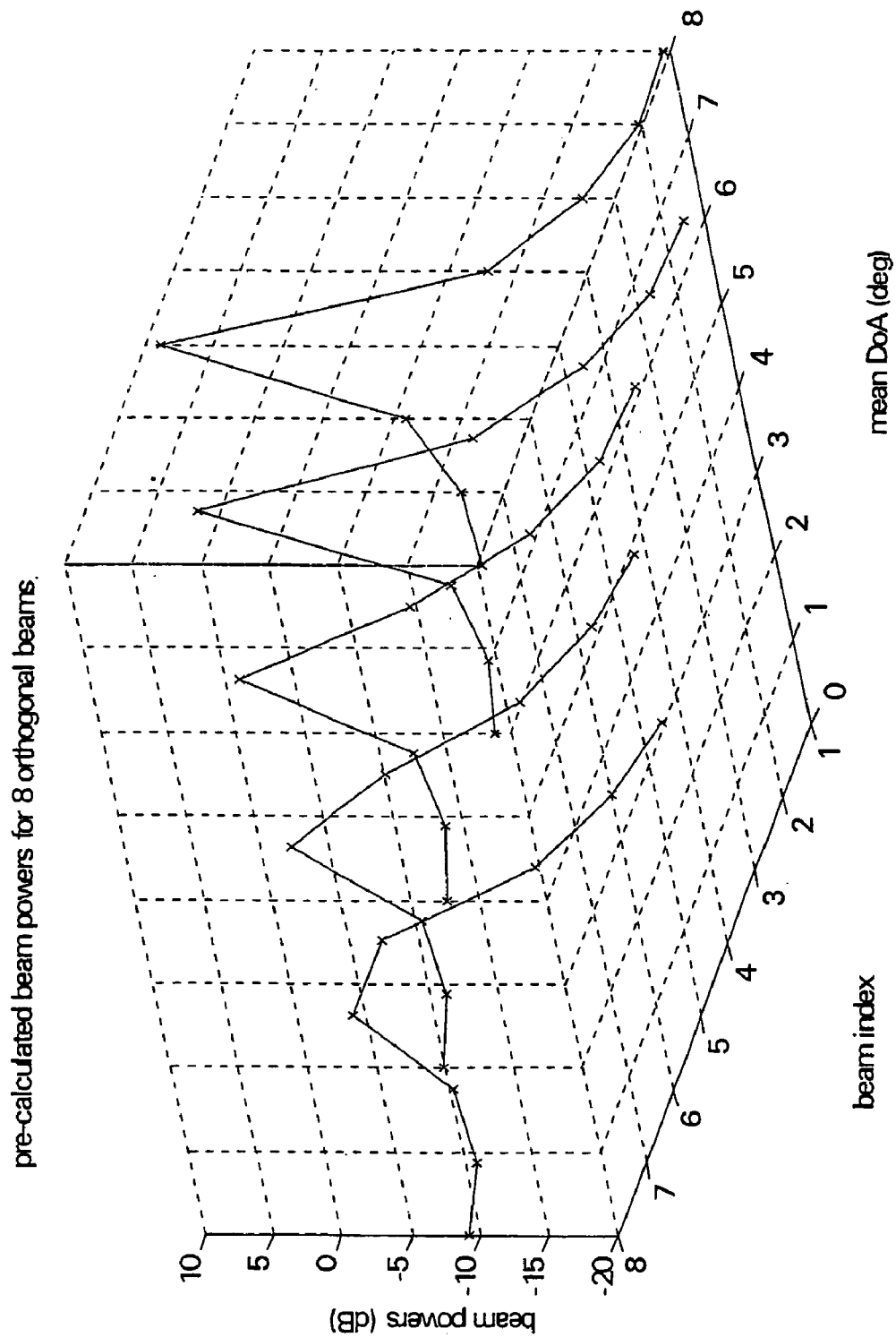
FIG. 3 shows an example of pre-calculated beam powers.

FIG. 3 illustrates in a three-dimensional co-ordinate system five sets of pre-calculated power distributions for a predetermined standard deviation of 1°. The calculation of the sets was based on an eight-beam array forming orthogonal beams and a Laplacian power azimuth spectrum. In the co-ordinate system, the values at the x-axis represent the direction of arrival in degrees for an angular region from 0° to 8°, and the values at the y-axis represent the beam index of the eight beams. The values at the z-axis, finally, represent the beam power in dB. Each of the five sets of power distributions is indicated by a curve connecting the beam power of eight beams formed for a specific direction of arrival. The number of sets in a given angular region is determined by the selected step size of the direction-of-arrival, which was set to 2° in this example.

Corresponding sets are stored for different angular regions and for different standard deviations.

As described above with reference to FIG. 1, uplink signals enter the eight-antenna array of the base station from a certain direction of arrival. The signals can be dedicated control signals or signals of a data channel. The digital beam matrix forms eight orthogonal beams for fixed reception angles out of the signals as depicted in FIG. 2a.

In the following, an uncertainty region of the direction of arrival is determined in the means for estimating the direction of arrival. To this end, the signal strength of at least some of the eight formed beams, each averaged over two received frames, is determined at the same delay position. The measured powers are normalised by the total power of all used components, the number of used components being equal to the number of beams used in the estimation of the deviation described below. The beam with the highest power is assumed to be pointing approximately to the direction of arrival. In case the power of one of the beams on the left or the right hand side of the beam with the highest power is significantly higher than the power of the beam on the respective other side, it is assumed that the direction of arrival lies between the direction of the beam with the highest power and the adjacent beam with the higher power, the region between those two beams being defined as uncertainty region. In case the power of the beams on the left and the right hand side of the beam with the highest power is essentially the same, it is assumed that the direction of arrival lies somewhere between the two adjacent beams, the region between those two adjacent beams being defined as uncertainty region. In this case, the beam with the highest power lies in the middle of the determined region.

The power distribution averaged of two received frames is then compared separately to all sets of power distributions stored for the determined uncertainty region, like the sets depicted in FIG. 3. More specifically, the deviation between the received power distribution and the stored power distributions is determined by calculating the respective mean-square-error between the formed power distribution and each pre-calculated power distribution of the uncertainty region.

For a corresponding simulation it was assumed that the user transmitting the received uplink signals is located at a position corresponding to a direction of arrival of the received signals of −10,5°. The standard deviation (Half Power Beam Width HPBW) of the signal was assumed to be 2°. There was one path Rayleigh fading channel with 120 km/h mobile speed. The uncoded bit error rate (BER) was about 15%. It was moreover assumed that an ideal power estimation can be achieved averaged over two frames.

Figure 4:
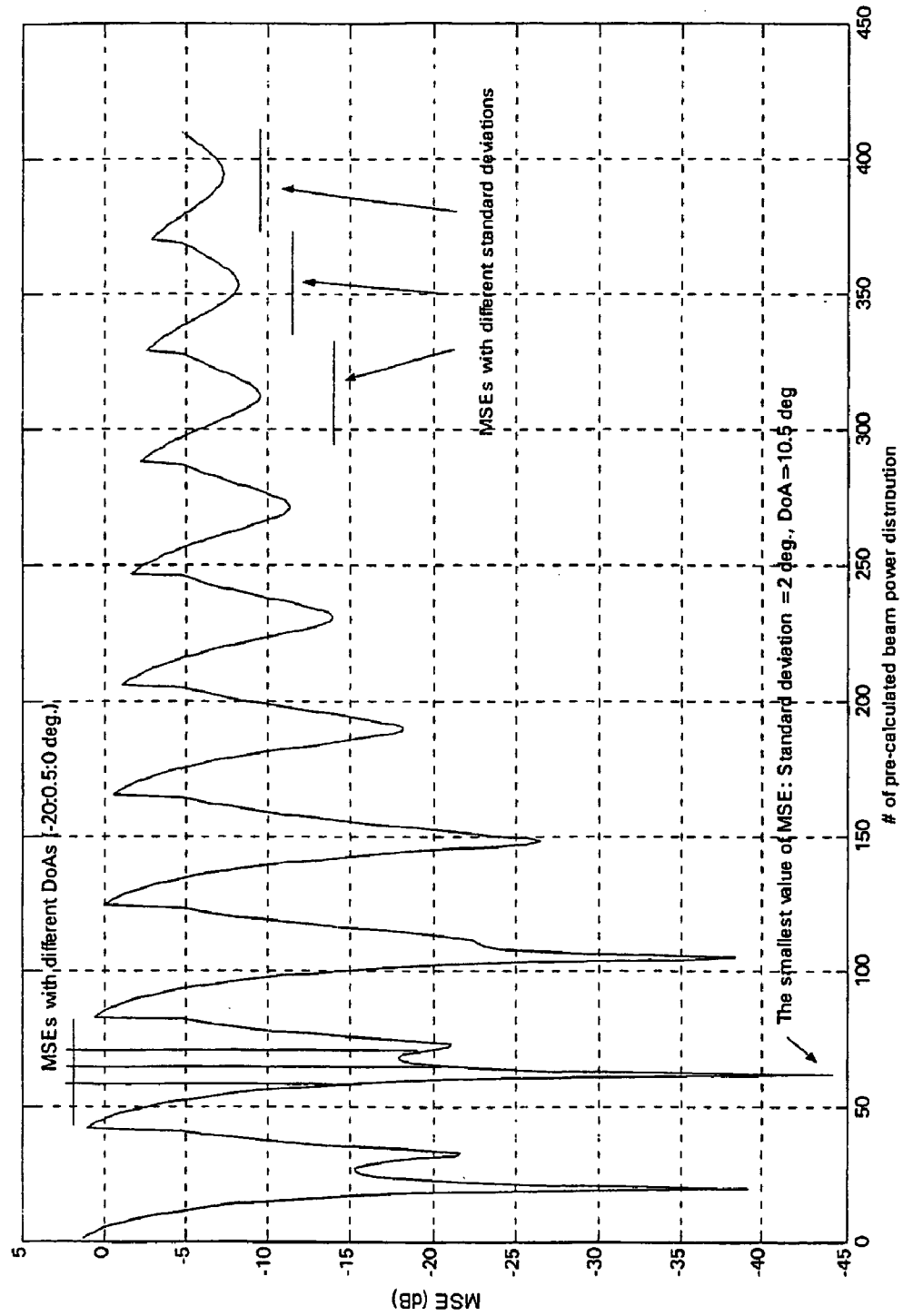
FIG. 4 shows a distribution of mean-square-errors resulting from a simulation.

FIG. 4 shows an example of a simulation result based on the above mentioned parameters, with the mean square error MSE calculated for more than 400 different sets of power distributions. The MSE is depicted in dB over the set numbers assigned to the different sets. The uncertainty region is represented 10 times in the diagram, each time with a different angular spread, first with a standard deviation of 1° then of 2° etc., up to a standard deviation of 10°. The set numbers within the uncertainty region are distributed from the lowest comprised degree of the direction of arrival to the highest comprised degree of the direction of arrival. In the diagram of FIG. 4, in the sets with a standard deviation of 2°, specific directions of arrival within the uncertainty region, namely −20°, 0.5° and 0°, are indicated as an example. Within each group of sets belonging to a specific standard deviation, a minimum MSE can be noted. The lowest overall MSE value indicates the set with the smallest deviation compared to the received power distribution. Since the determination of each set is based on a specific combination of a direction of arrival and of a standard deviation, the minimum MSE indicates the most probable combination belonging to the received signals.

In the fading channel, the power azimuth spectrum fades according to the channel coefficients. Thereby, the short-term average of the direction of arrival, in the present example an average over two consecutive radio frames of 20 ms, can differ from the actual value, which was set here to −10,5°. The estimation of the direction of arrival and of the standard deviation can therefore be further improved, if the comparison of the power distributions described with reference to FIG. 4 is carried out for a plurality of short-term averages and if the different resulting estimations are then statistically evaluated to receive a final estimation.

Figure 5:
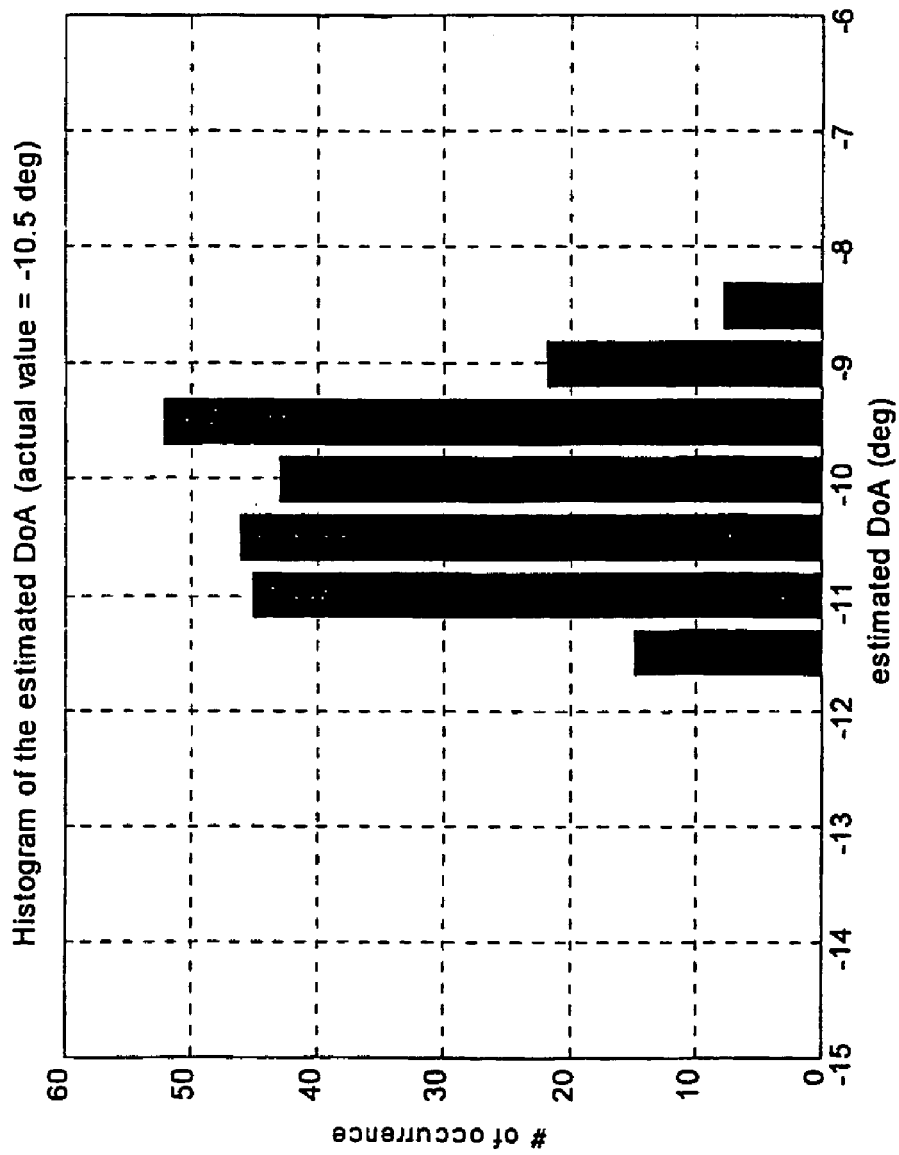
FIG. 5 shows a histogram of estimated directions of arrival resulting from a simulation.

FIG. 5 is a histogram of estimated directions of arrival for 450 frames, which corresponds to 225 estimations based on an average over two frames respectively. The histogram shows the number of occurrence of each estimated direction of arrival. It can be seen that the mean value of the direction of arrival is about −10,5°.

Figure 6:
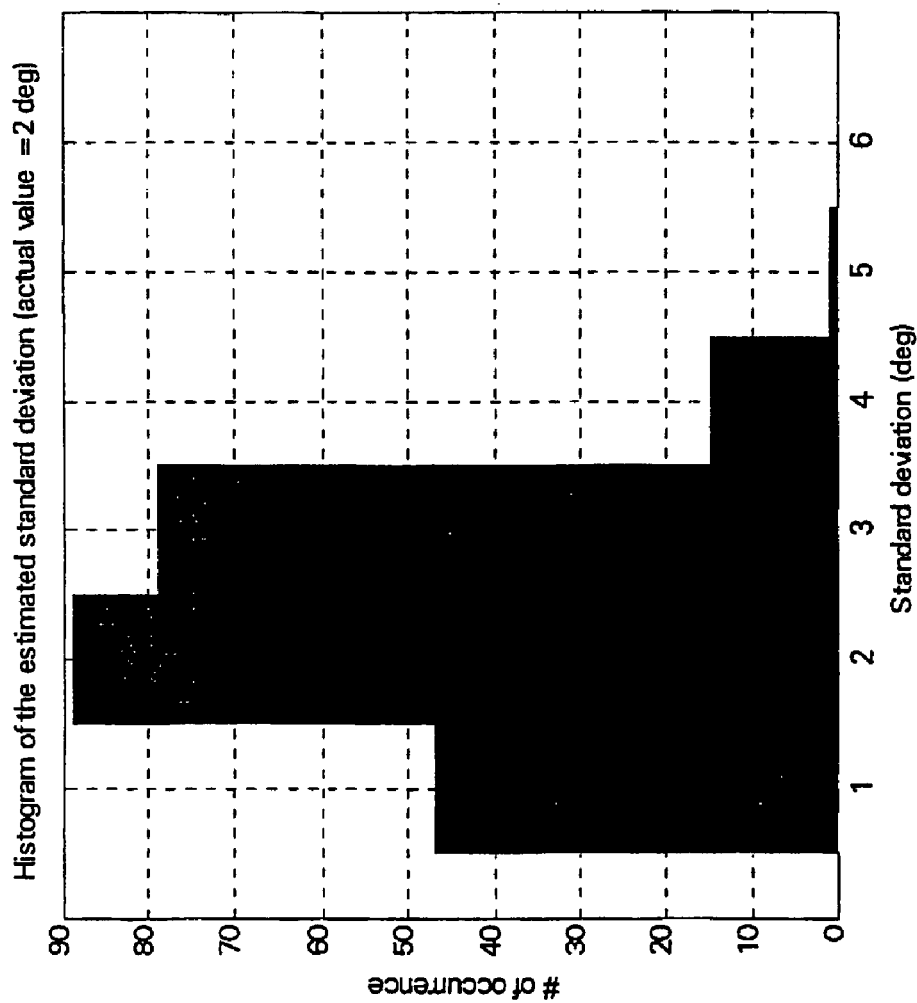
FIG. 6 shows a histogram of estimated standard deviations resulting from a simulation.

FIG. 6 is a corresponding histogram showing the number of occurrence of each of 225 estimated standard deviations. The mean value of the standard deviation is about 2°.

Therefore, both, estimated direction of arrival and standard deviation, are very close to the actual direction of arrival and the actual standard deviation that were used for the simulation.

What is claimed is:

1. Base station for a radio communications network, comprising:
   a phasing network (11) for forming beams for fixed reception angles out of received signals provided by a receive antenna array;
   means (13) for determining the minimum deviation between a distribution indicative of the signal strengths of at least some of the formed beams and a plurality of pre-calculated distributions indicative of signal strengths of beams, each pre-calculated distribution corresponding to a different value of at least one specific parameter of the received signals; and
   means (13) for estimating the value of the at least one parameter in the uplink according to the minimum deviation.

2. Base station according to claim 1, further comprising a receive antenna array for receiving signals from a terminal and for providing the received signals to the phasing network (11) of the base station.

3. Base station according to claim 1, wherein the at least one parameter is the direction of arrival and/or the standard deviation constituting the angular spread of the received signals.

4. Base station according to claim 3, further comprising a transmit antenna array for transmitting a beam in the estimated direction of arrival.

5. Base station according to claim 3, further comprising a transmit antenna array for transmitting a beam with an estimated angular spread.

6. Base station according to claim 3, further comprising for downlink null steering a transmit antenna array for transmitting a downlink beam according to the parameters belonging to received signals of users interfering with the received signals of a user for which the downlink beam is destined.

7. Base station according to claim 1, further comprising means (13) for determining signal values indicative of the signal strengths for at least some of the formed beam, and for determining an angular region in which the direction of arrival should lie according to the determined signal values indicative of the signal strengths of the beams, wherein the means (13) for determining the minimum deviation is suited for determining the minimum deviation only based on a comparison with pre-calculated distributions corresponding to directions of arrival in said angular region.

8. Base station according to claim 1, wherein the means (13) for determining the minimum deviation are suited to determine as minimum deviation the minimum of the sum of the mean-square-errors of signal values used for the distribution indicative of the signal strengths for at least some of the formed beams as compared to the signal values of one of the pre-calculated distributions.

9. Base station according to claim 1, wherein the means for determining the minimum deviation is suited to use as distribution indicative of the signal strengths of at least some of the formed beams a distribution averaged over a predetermined time period.

10. Base station according to claim 1, further comprising a filter structure for filtering the distribution indicative of the signal strengths of the formed beams before feeding it to the means (13) for determining the minimum deviation.

11. Base station according to claim 1, further comprising means (13) for normalising the signal values used for the distribution indicative of the signal strengths of the beams used for the distribution with the corresponding total signal value of all beams used for the distribution.

12. Base station according to claim 1, wherein the means (13) for determining the minimum deviation store pre-calculated distributions for different directions of arrival with different standard deviations, and wherein the means (13) for estimating the at least one specific parameter are suited for estimating as expected direction of arrival and as standard deviation of the distribution of the received signals the direction of arrival and the standard deviation corresponding to the pre-calculated distributions resulting in the minimum deviation.

13. Base station according to claim 1, wherein the means (13) for determining the minimum deviation are suited to determine the minimum deviation for each of a plurality of consecutively determined distributions, and wherein the means (13) for estimating the at least one parameter of the signals received in the uplink are suited to estimate as value for the at least one parameter the mean value of the parameters corresponding to the pre-calculated distributions resulting in the respective minimum deviation.

14. Base station module for a base station comprising means for determining the minimum deviation between a distribution indicative of the signal strengths of at least some of formed beams and a plurality of pre-calculated distributions indicative of signal strengths, the pre-calculated distributions corresponding to different values of at least one parameter of the received signals, according to claim 1.

15. Method for enhancing the estimation of parameters of signals in the uplink in a base station of a radio communications network, comprising:
   receiving uplink signals with a receive antenna array of the base station;
   forming beams for fixed angles of arrival out of the received signals;
   determining the minimum deviation between a distribution indicative of the signal strengths of at least some of the formed beams and a plurality of pre-calculated distributions indicative of signal strengths, the pre-calculated distributions corresponding to different values of at least one parameter of the received uplink signals; and estimating as value of the at least one parameter of the received signals the value of the at least one parameter corresponding to the determined minimum deviation.

16. Method according to claim 15, wherein the estimated value of the at least one parameter of the received signals is used for forming a downlink beam.

17. Method according to claim 15, wherein the estimated value of the at least one parameter of the received signals is used for downlink null steering, the parameter belonging to received signals of users interfering with the received signals of a user for which the downlink beam is destined.

18. Method according to claim 15, wherein the at least one parameter is indicative of the direction of arrival and/or the standard deviation constituting the angular spread of the received signals.

19. Method according to claim 15, comprising before determining the minimum deviation:

determining signal values indicative of the signal strengths of at least some of the beams;

determining an angular region in which the direction of arrival should lie according to the determined signal values indicative of the signal strengths of the beams;

determining the minimum deviation only based on the pre-calculated distributions corresponding to directions of arrival in said angular region.

20. Method according to claim 15, wherein the minimum deviation is determined as the minimum of the sum of the mean-square-errors of the signal values used for the distribution indicative of the signal strength of each formed beam as compared to the signal values of one of the pre-calculated distributions.

21. Method according to claim 15, wherein the distribution over at least some of the formed beams is averaged over a predetermined time period before determining the deviation.

22. Method according to claim 15, wherein the distribution over at least some of the formed beams is filtered before determining the deviation.

23. Method according to claim 15, wherein the signal values used for the distribution indicative of the signal strengths of the beams that are to be used are normalised with the total signal value of all beams that are to be used.

24. Method according to claim 15, wherein the distribution over at least some of the formed beams is compared to pre-calculated distributions for different directions of arrival with different standard deviations, the determined minimum indicating the expected direction of arrival and at the same time the expected standard deviation indicative of the angular spread of the received signal.

25. Method according to claim 15, wherein the minimum deviation is determined for each of a plurality of consecutive distributions over at least some of formed beams, the value of the at least one parameter being estimated as the mean value of the parameters corresponding to the pre-calculated distributions with the respective minimum deviation for each of the consecutive distributions.

* * * * *